US006974324B1

(12) United States Patent
Gregoire et al.

(10) Patent No.: US 6,974,324 B1
(45) Date of Patent: Dec. 13, 2005

(54) ADAPTABLE DEVICE FOR DELIMITING AND ORGANIZING SPACES AND VOLUMES

(76) Inventors: Nicaise Gregoire, 92350, Le Plessis Robinson (FR); Philippe Hayer, 92350, Le Plessis Robinson (FR)

( * ) Notice: Subject to any disclaimer, the term of this patent is extended or adjusted under 35 U.S.C. 154(b) by 0 days.

(21) Appl. No.: 09/926,203

(22) PCT Filed: Mar. 6, 2000

(86) PCT No.: PCT/FR00/00552

§ 371 (c)(1), (2), (4) Date: Sep. 24, 2001

(87) PCT Pub. No.: WO00/56992

PCT Pub. Date: Sep. 28, 2000

(30) Foreign Application Priority Data

Mar. 24, 1999 (FR) ........................................... 99 03639

(51) Int. Cl.[7] ............................................... G09B 25/04

(52) U.S. Cl. ............................ 434/72; 434/73; 434/75; 434/79

(58) Field of Search ............................ 434/72, 73, 74, 434/75, 76, 77, 78, 79, 80; 446/476, 478; 52/27, 29, 65, 70, 71

(56) References Cited

U.S. PATENT DOCUMENTS 513,688 A * 1/1894 Smith ......................... 446/478
2,607,972 A * 8/1952 Rust ........................... 403/403
3,392,462 A * 7/1968 Everhart ...................... 434/72
3,603,004 A * 9/1971 Fink ............................ 434/73
3,646,690 A * 3/1972 Feagan ........................ 434/73
3,691,671 A * 9/1972 Kroll .......................... 446/476
4,104,837 A * 8/1978 Naito .......................... 52/579
4,626,218 A * 12/1986 Wright ........................ 434/73
4,652,239 A * 3/1987 Brimberg ..................... 434/80
4,785,590 A * 11/1988 Jones ............................ 52/64
4,833,840 A * 5/1989 Kalischewski et al. ........ 52/64
4,884,988 A * 12/1989 McMurray .................. 446/115
5,401,202 A * 3/1995 Guza et al. ................. 446/476
5,910,037 A * 6/1999 Bach et al. ................. 446/108
6,074,211 A * 6/2000 Reid ........................... 434/81

* cited by examiner

*Primary Examiner*—Kurt Fernstrom
(74) *Attorney, Agent, or Firm*—Armstrong, Westerman & Hattori, LLP

(57) ABSTRACT

An evolutionary and reusable device for delimiting and organising spaces and volumes, adaptable to the dimensions of an existing architectural space, is capable of being modified without accessories, easily and rapidly decorated by the user by means of decorative objects and expandable connected space elements of fixed and variable dimensions.

17 Claims, 5 Drawing Sheets

ADAPTABLE DEVICE FOR DELIMITING AND ORGANIZING SPACES AND VOLUMES

FIELD OF THE INVENTION

The device according to the invention is designed, nonexclusively, to construct fair and exhibition stalls or to construct partial or complete study models representing organized or unorganized architectural spaces.

BACKGROUND OF THE INVENTION

Usually, fair and exhibition stalls, architectural or interior decoration models are of fixed dimensions and apply to a single project. Thus, the large variety of shapes and dimensions of the rooms or the areas to be organized rarely permits reusing the elements representing the walls, a situation which requires their fabrication at the required length. This entails expenses associated with the use of raw materials and with the time spent in the fabrication of the walls, expenses which are not always recouped by the outcome of the project. As regards fair and exhibition stalls, the areas and the shapes of the spaces allocated to an exhibitor vary enough to necessitate custom fabrication. Certain systems claim to be adaptable to the actual dimensions while using standardized, juxtaposable elements of fixed dimensions. However, the variety of constructions and areas necessitates having a large number of different elements, a situation which negatively affects the ease of construction, stability, and rigidity.

Despite a large number of different elements, it is necessary to make an approximation concerning the length of the walls, a situation which negatively affects the study of the space occupied and the evolutionary zones or the optimum use of the area to be organized.

Moreover, the organization and decoration of these spaces is often nonexistent or stylized, i.e., simplified or standardized, for obvious economic reasons, without leaving the user the possibility of adaptation to individual needs.

SUMMARY OF THE INVENTION

The present invention remedies these disadvantages by proposing a device for delimiting and organizing spaces and volumes, which is evolutionary, reusable, adaptable to the dimensions of an existing architectural space, modifiable without accessories, and easily and rapidly decorated by the user.

Throughout the following, we will adopt the convention of using the term space element for an element which enables delimiting a space representing, by way of example and nonrestrictively, in reduced scale or not, a wall, a low wall, a portion or all of a floor, a portion of a ceiling; of using the term decorative object for an object representing, by way of example and nonrestrictively, in reduced scale or not, furniture, architectural or decorative elements, such as a door, a window, a plumbing fixture, a technical conduit, a power outlet, a person; of using the term coupling for a link designed to connect two space elements temporarily or definitively. We will also adopt the convention of using the adjective magnetic to indicate the presence of ferromagnetic properties intrinsic to or added to the element described and of using the adjective magnetized to indicate the presence of magnetic fields intrinsic to or added to the element described.

The present invention concerns an evolutionary, reusable device to partially or completely create a volume by means of basic forms with variable or invariable dimensions, connected by couplings and decorated by decorative objects. These basic forms are, by way of example and nonrestrictively, portions of planes, portions of volumes with a simple or complex geometric shape, with said basic forms capable of being decorated.

This device is constituted of, depending on its final use, at least one of the following elements, the list of which is provided by way of example and nonlimitingly, with neither restriction or limitation with regard to their quantities or their qualities:

- a support plane, which may be magnetic, which may be foldable, and which may be composed of space elements,
- space elements, of any shape whatsoever, which may be magnetic, with variable dimensions, connected to each other in a manner which may be temporary by means of at least one coupling,
- decorative elements scaled to the space elements, of which the decoration may be removable, which can be positioned on the space elements by means of a link,
- fastening accessories which may be articulated, which may be magnetized, such as corner braces, removable articulated connectors.

SHORT DESCRIPTION OF FIGURES

The annexed drawings represent, by way of nonrestrictive examples, some embodiments of the device according to the invention.

FIG. 1 is a front view of a space element.

FIG. 2 schematically depicts a top view of a closed space delimited by space elements composed of female parts connected to each other by a permanent coupling and male parts connected to each other by a permanent coupling.

FIG. 3 schematically depicts a top view of a closed space delimited by space elements composed of female parts connected to each other by a disassemblable coupling and male parts connected to each other by a disassemblable coupling.

FIG. 4 schematically depicts a top view of a space delimited by space elements of which the male element is connected to the female element by a permanent coupling.

FIG. 5 schematically depicts a top view of a space delimited by space elements of which the male part is connected to the female part by a disassemblable coupling.

FIG. 6 schematically depicts a top view of a closed space with adjacent planes delimited by space elements composed of a female part and a male part connected by a permanent fixed coupling (9), and by individual male (12) and female (11) parts having a fixed, permanent coupling.

FIG. 7 schematically depicts a top view of a closed space with adjacent planes delimited by space elements (13) connected by disassemblable couplings.

It should be pointed out that in these drawings, the dimension and the proportions are not systematically respected; this is done to facilitate comprehension.

DESCRIPTION OF PARTICULAR EMBODIMENTS

Description of the Support Plane

The support plane enables maintaining the space elements in their relative positions. The support plane may be constituted of one or a plurality of space elements, connected by fixed or removable couplings, which are disassemblable or nondisassemblable. The support plane holds the space elements in place by simple contact friction, or by means of a fastening accessory.

Description of a Space Element

A space element defines a flat area or a portion of volume. In general, a space element is made up of at least one part equipped with at least one fastening portion. More precisely, a variable-dimension space element is made up of at least two parts (FIG. 1), a male part (1) and a female part (2), which slip one into the other. The female part and the male part are composed of one or a plurality of permanently assembled parts. The male part and the female part of a space element may have ferromagnetic properties, which are intrinsic or which have been added over all or part of their surface. To facilitate the length adjustment of a space element, the male part is graduated (3). The length represented is read directly from the intersection of the graduated scale with the edge of the female part in contact with the male part.

To facilitate the reading of the length of a space element, a notch (4) is made in the female part, at the level of the graduated scale on the male part. At the minimum length, the male part abuts the female part, yielding the minimum dimension that the space element can delimit.

The length of the space element can be maintained by means of a blocking system, for instance, a locking wedge, activated or added after the length is set.

Description of the Coupling

Figure 2:
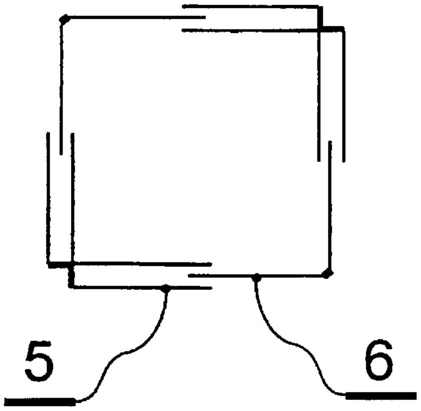
Figure 3:
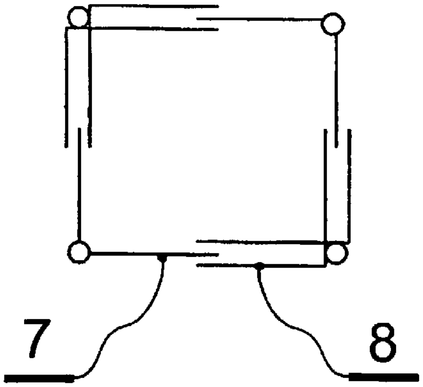
Figure 4:
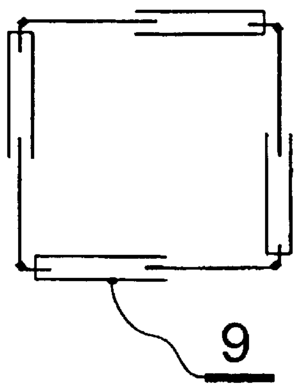
Figure 5:
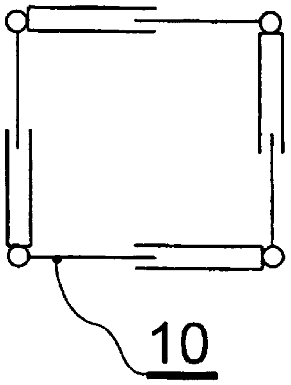
Figure 7:
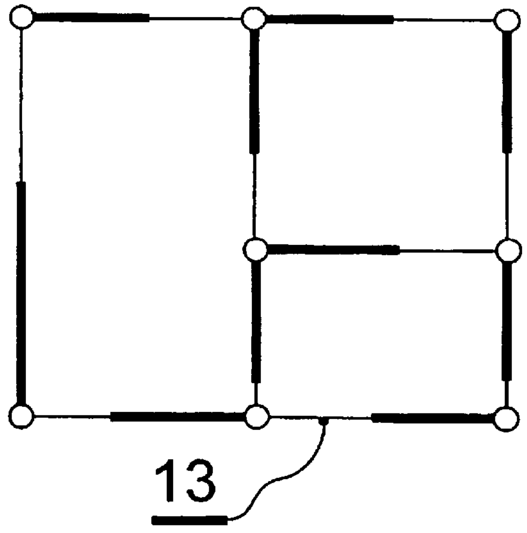
Figure 8:
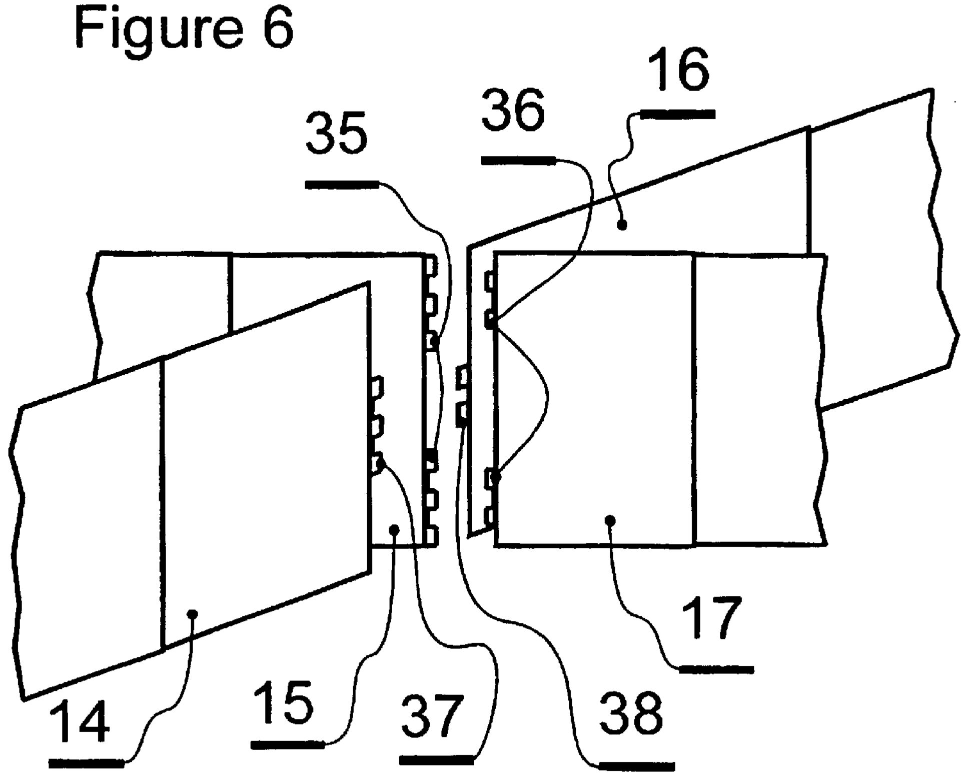
FIG. 8 is an exploded perspective view of an intersecting group of space elements (14 & 16) and of an intersected group of space elements (15 & 17) constituting an intersection. The coupling depicted is of a disassemblable type.

The coupling which enables connecting two space elements is ideally designed to connect at least two space element parts to each other while still enabling said parts to pivot relative to each other on an axis parallel to the edges of the parts in contact and permitting the intersection of space element assemblies. More precisely, the coupling comprises at least one segment and is composed of at least one part called a portion. The coupling is present on at least one space element part. The coupling connects either the female parts (FIG. 2 Item 5 or FIG. 3 Item 8) or the male parts (FIG. 2 Item 6 or FIG. 3 Item 7) of two space elements, or the male part of a space element to the female part of another space element (Item 9 of FIG. 4 and 6 or FIG. 5 Item 10). Each space element part has, depending on the mode of fabrication of the coupling, at least one coupling portion on at least one of its edges (FIG. 8). The arrangement of these coupling portions enables construction of adjacent spaces (FIG. 6 and 7), even when the intersection of the space elements does not form a right angle.

Throughout the following, we adopt the convention of using the term fixed coupling for a disassemblable or permanent coupling which cannot be easily separated from a space element; of using the term removable coupling for a disassemblable or permanent coupling which can be easily separated from a space element; of using the term disassemblable coupling for a fixed or removable coupling whose component parts can be easily separated; and of using the term permanent coupling for a fixed or removable coupling whose component parts cannot be easily separated.

In general, a fixed or removable coupling which connects two space elements can be permanent or disassemblable.

1. Description of a Permanent Coupling

Figure 6:
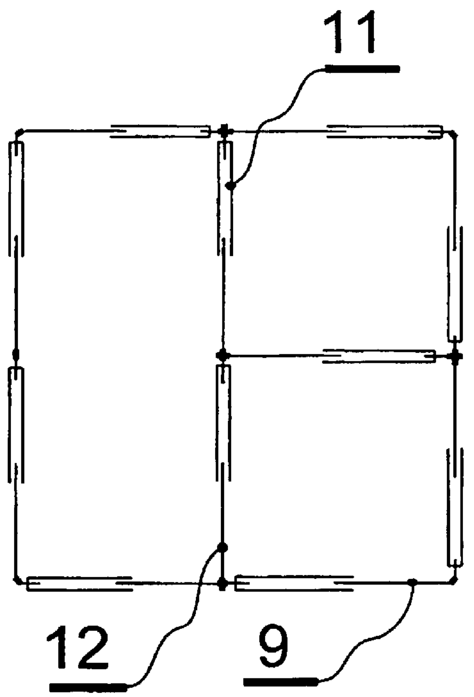

When the fixing of the coupling is permanent, the device comprises space element parts connected to each other by a coupling as well as independent space element parts with at least one coupling (FIG. 6 Item 11 and 12). This coupling occupies approximately one-half the height of the space element in order to permit the intersection of space elements, a situation which allows construction of adjacent spaces (FIG. 6).

2. Description of a Disassemblable Coupling

The solution with a disassemblable coupling is best. In fact, if the coupling is disassemblable, a single type of space element having at least one portion of a coupling on at least one of its ends suffices. The use of a disassemblable link also enables facilitating the organization and visualization of spaces with small dimensions. Thus, once one link is disassembled, it is possible to pivot the space elements which remain connected to spread them apart, a situation which increases accessibility for placement of the decorative objects.

The segments of a disassemblable coupling of an intersected group of space elements (FIG. 8 Item 15 & 17) are located high and low on the adjacent edges of the space elements. The coupling of an intersecting group of space elements (FIG. 8 Item 14 & 16) is located at the center of the adjacent edges of the space elements. The distance between the high and low segments of a coupling of an intersected group of space elements is such that it enables the passage of the central coupling of an intersecting group of space elements. Ideally designed, the coupling of the intersected group of space elements and the coupling of the intersecting group of space elements integrates the space elements while still leaving them free to pivot relative to each other.

The Decorative Objects

The decorative objects include, nonrestrictively, persons, furniture placed on the floor or hanging on the wall, windows and doors of different formats, stairs, cooktops, work surfaces, and any object that may be part of the decoration of a space or which enables providing more realism for a model or a fair or exhibition stall, as well as accesses to technical conduits, power outlets, gas and water connections.

Figure 9:
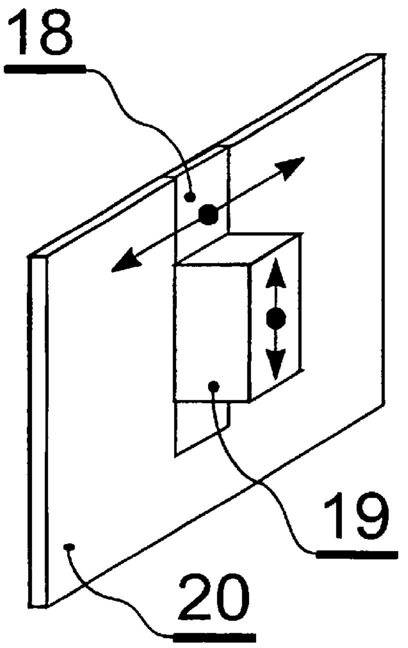
FIG. 9 is a perspective depiction of a decorative object (19) positioned by a strip (18) sliding on a schematically depicted space element (20). The horizontal arrows represent the relative movement of the sliding strip in relationship to the space element; the vertical arrow represents the relative movement of the decorative object in relationship to the sliding strip.
Figure 10:
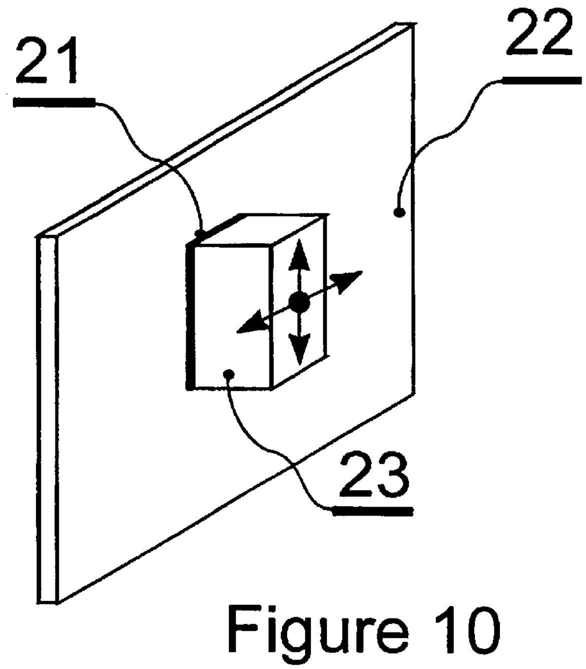
FIG. 10 is a perspective depiction of a magnetized decorative object (23) positioned on a schematically depicted space element (22). The arrows represent the relative movements of the decorative object in relationship to the space element.

A decorative object is positioned on a space element (FIG. 9 Item 20) by means of a link which may be either sliding (FIG. 9 Item 18) relative to the decorative object (FIG. 9 Item 19) or magnetized. A magnetized decorative object (FIG. 10 item 23) has at least one magnetized system (FIG. 10 Item 21) generating a magnetic force adequately weak relative to human muscle power or whose magnetism can be deactivated by the user. When a magnetized decorative object is placed in contact with a magnetic space element (FIG. 10 Item 22), the magnetic force generated is adequate to maintain the relative position of the decorative object in relationship to the space element.

A decorative object can be produced starting from any material whatsoever or a combination of materials, for example, plastic, metal, mineral, or cellulose, which can be molded, folded, assembled, or shaped by any other process.

Removable Decoration Supports

1. The Case of Front Faces

In order to leave the user the possibility of adapting the decorative objects to his or her needs, certain decorative objects may receive a fixed or removable decoration support made of a transparent material, which can be decorated. In the illustration (FIG. 11) presented by way of example, the decoration support (25) slips onto the front face of the decorative object (24). Thus, the user may insert a decorated design (26) on an element, a situation which makes it possible to avoid the need to have a plurality of decorative objects for different decorations.

2. The Case of Decorated Jackets

Figure 12:
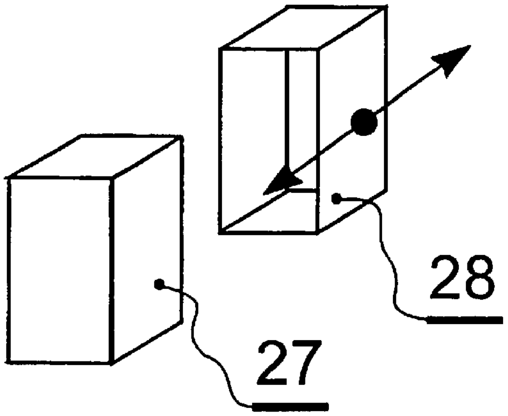
FIG. 12 is an exploded perspective view of a decorative object (27) on which a decoration support (28) is applied.
Figure 13:
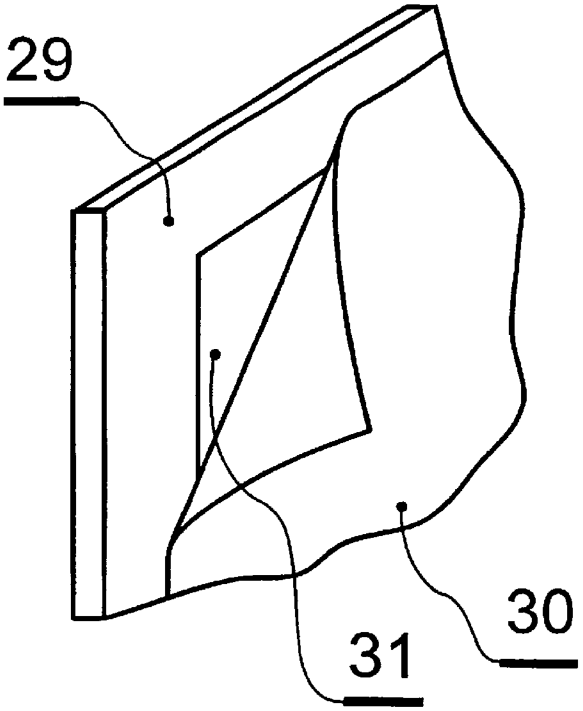
FIG. 13 is an enlarged detailed view of a peeled space element showing how, by the affixing of a metal sheet (31), magnetic properties are added to a space element made of a nonmagnetic material (29).

The decorative objects may also be completely or partially covered by a decoration support. The decoration may be, by way of example and nonrestrictively, applied by printing before or after being formed into a jacket. This jacket, adapted to the shape of the decorative object for which it is intended, is applied thereon so as to completely or partially cover it. In the illustration (FIG. 12) presented by way of example, the decoration support (28) slips over the decorative object (27). Thus, the user may insert a decorated design between the decorative object and the decorative jacket, or change jackets if the jacket itself is decorated, a situation which makes it possible to avoid the need to have a plurality of decorative objects for different decorations.

Description of the Mounting Accessories

Different mounting accessories are used such as, by way of example and nonrestrictively, fixed or articulated squares, which may be magnetized, to hold the space elements in their relative position.

Use and Usefulness of the Invention

The invention is applicable to numerous sectors of activity; by way of example and nonrestrictively, it is possible to mention the construction of fair and exhibition stalls and the construction of models for interior organization projects. The elements of the model may exactly represent the elements used for the construction of a stall, put to scale.

Exemplary Embodiment

The exemplary embodiment described concerns the use of the device, by way of example and nonrestrictively, to create models of interior design projects by means of magnetic space elements connected by a fixed, disassemblable coupling and organized by means of magnetized decorative objects.

A different use of the device such as the creation of stalls intended for fairs and exhibitions would result in a different embodiment complying with the characteristics of the invention. The embodiment is described hereinafter as a nonrestrictive example with reference to the annexed drawings.

1. Fabrication of a Space Element

The space elements permit, by way of example and nonrestrictively, representation on a reduced scale of walls with the following dimensions:

Wall with a length between 1 m and 1.45 m.

Wall with a length between 1.45 m and 2.45 m.

Wall with a length between 2.45 m and 4.4 m.

Wall with a length between 3 m and 5.7 m.

These walls with, by way of example and nonrestrictively, a height of 2.70 m enable representation of a large variety of shapes and dimensions of rooms.

Figure 1:
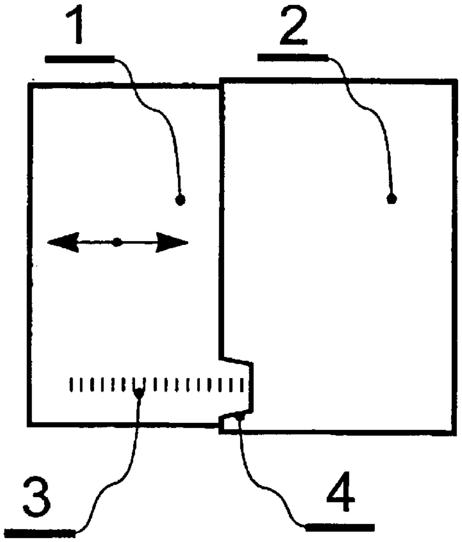

As depicted in FIG. 1, a space element is composed of two parts, the male part and the female part.

The male part is fabricated, by way of example and nonrestrictively, starting with a rectangle with low thickness, made of 2-mm cardboard or pasteboard. This rectangle is defined by a height and a length.

The female part is fabricated by assembly of three elements: the base, the body, and the face.

The base is fabricated, by way of example and nonrestrictively, starting with a rectangle made of cardboard or pasteboard of the same thickness as the male part but with a low length, by way of example and nonrestrictively, a length of 1 cm.

The body is fabricated, by way of example and nonrestrictively, starting from an evolute in a rectangular shape with low thickness, by way of example and nonrestrictively, 0.5 mm. The height of this rectangle is equal, by way of example and nonrestrictively, to the perimeter of the base section. This rectangle is folded and assembled, by way of example and nonrestrictively, by gluing around the height of the base.

The face is fabricated starting with a sheet with the final dimensions of the female part, with low thickness and glued to the edge of the junction of the edges of the body.

The dimensions of the internal opening with a rectangular cross-section obtained are such that the male part slips with friction into the female part.

2. Addition of Magnetic Properties to a Space Element

Magnetic properties are added to space elements made of nonmagnetic materials such as cellulosic materials (paper, cardboard, pasteboard, wood . . . ) or plastic or composite materials by means of the following structure:

A thin sheet (31) having ferromagnetic properties is fixed between the body of the space element (29) and a nonmagnetic sheet (30). The unit is assembled, by way of example and nonrestrictively, by applying a permanent adhesive on the two faces of the thin sheet having ferromagnetic properties. The operation is repeated for each face that it is necessary to render magnetic. The thin sheet having ferromagnetic properties may be solid or perforated (of a grid, expanded metal, or other type). The nonmagnetic sheet (30) may be replaced by a coat of varnish, paint, plastic material, or any other material capable of being applied to a surface.

The choice of the thickness of the nonmagnetic sheet permits adjustment of the force required to hold the magnetized decorative object when it is applied to the space element.

3. Fabrication of a Disassemblable Coupling by Means of a Cyclic Profile

Figure 14:
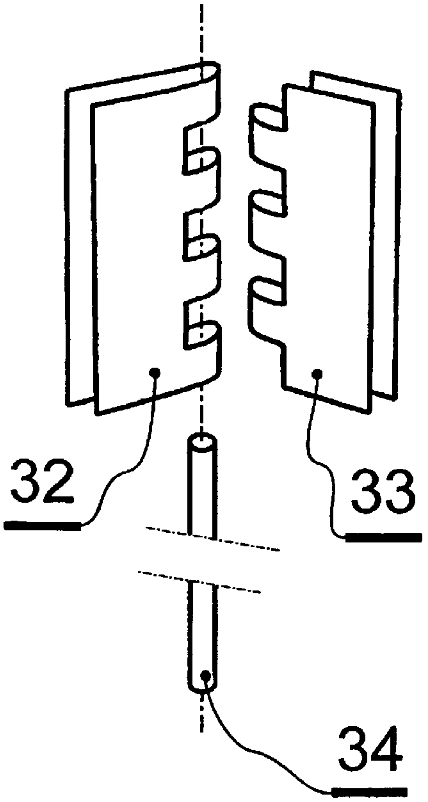
FIG. 14 is a perspective view of the different portions, male (33) and female (32), which make up a coupling with a cyclic profile.

A disassemblable coupling segment (FIG. 14) is made up of three parts: the male profile (33), the female profile (32), and a pin (34). A profile is produced starting from a strip perforated along its axis by holes spaced at a constant interval, folded on its longitudinal axis with a radius equal to at least half the thickness of the space element part for which it is intended. Once folded, the profile has notches. The material used may be, by way of example and nonrestrictively, a metal, plastic, cellulosic material, or a woven material used alone or combined with other materials.

Each space element has two types of coupling portion at its ends: at least one male cyclic profile and at least one female cyclic profile. The male cyclic profile differs from the female cyclic profile by an offset of one interval of the notches which constitute it. To connect two space elements, it suffices to place the male cyclic profile in the notches of the female cyclic profile and to introduce a pin into the internal opening of the coupling thus constituted. The pin has a gripping zone added or implemented by construction.

Each cyclic profile is fixed, by gluing or by any other fixation means, on a part of a space element or is included in the evolute of a part of the space element.

4. Fabrication of a Decorative Element

The decorative objects are fabricated, by way of example and nonexclusively, of pasteboard with a thickness sufficient to provide some level of rigidity while permitting their manipulation. A decorative object may be obtained, by way of example and nonrestrictively, starting from a plane surface, also called an evolute, folded so as to obtain a volume representing a decorative object on the scale of the space elements. Designs that define the appearance of the decorative element are printed on the different faces of the volume. If necessary, the evolute of a decorative object is skillfully designed in order to enable, after folding, the placement of a decoration support and a possible sliding strip.

5. Fabrication of a Magnetized System for the Decorative Objects

The magnetized link (FIG. 10 Item 21) enabling positioning of a decorative object on a space element is composed, by way of example and nonrestrictively, of at least one thin permanent magnetic fixed on one or a plurality of faces of the decorative element. The permanent magnet may be produced in the form of a magnetized sheet having magnetic fields of alternating polarity, which generates a weak magnetic force to permit displacement of the decorative object, but sufficient to support the weight of the decorative object on a space element having magnetic properties.

6. Fabrication of a Sliding Strip

If the use of a magnetized link is not appropriate, the decorative item will be positioned by means of at least one sliding strip (FIG. 9 Item 18) made of a transparent plastic material. The width of the strip is equal to the length of the recess skillfully made in the decorative object (19), such that the strip is slightly wedged in order to hold the decorative object and prevent its falling under the action of gravity. One end of the strip is in the shape of a hook in order to hang the unit on a space element (20).

7. Fabrication of a Decoration Support

Figure 11:
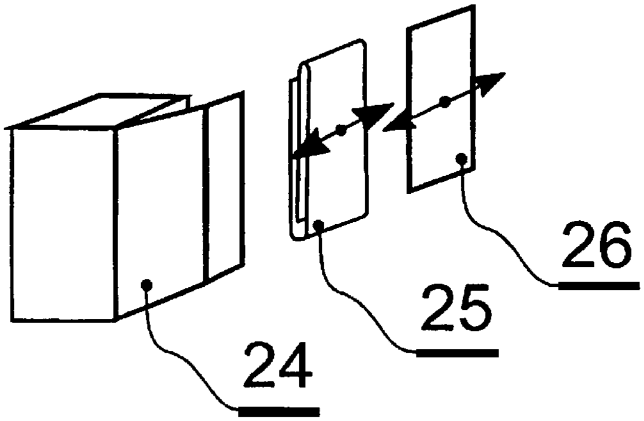
FIG. 11 is an exploded perspective view of a decorative object (24) on which a decoration support (25) and a decorated design (26) are applied.

The fabrication of the decoration support varies depending on the decorative object to which it is applied. A decoration support may, by way of example and nonrestrictively, be implemented in a strip of folded transparent plastic material (FIG. 11 Item 25) such that, once folded, it slides onto the forward face of a decorative element (FIG. 11 Item 24).

In the illustration (FIG. 12); the decoration support (28) produced by shaping a sheet of plastic material covers a part of the faces constituting the decorative object (27).

Advantages Obtained by the Invention

The invention enables designing and constructing arrangements within the framework of the organization of architectural spaces or fair or exhibition stalls starting with predefined space elements, with variable dimensions, combinable among themselves, on which it is possible to apply decorative objects whose decoration can be modified in a simple manner. All these elements are reusable, a situation which reduces the cost of their production and use.

Figure 15:
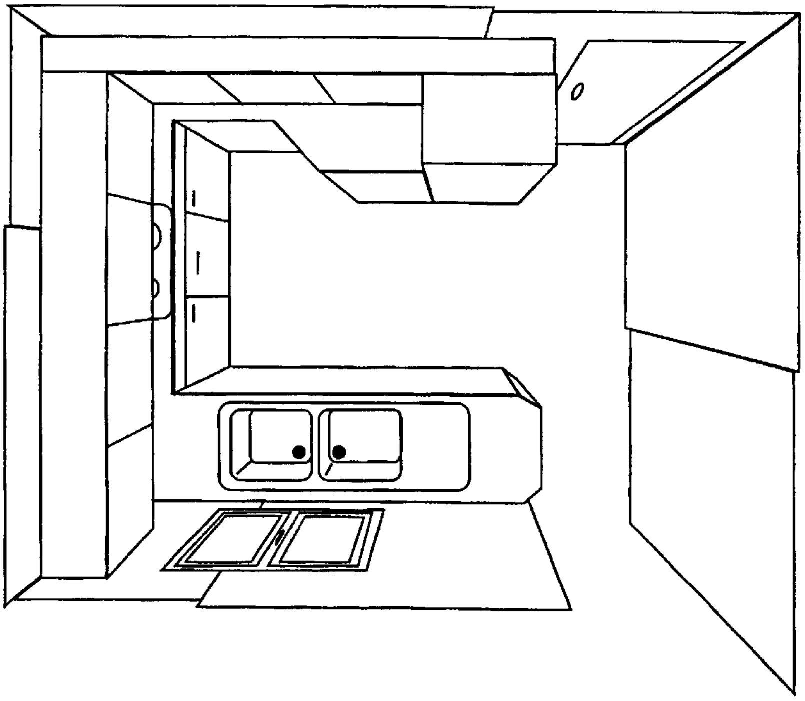
FIG. 15 depicts an example of use of the device to study the organization of a kitchen. The device is depicted in perspective, viewed from above.

Used within the framework of constructing models for interior design projects, the invention does away with the rigidity and the difficulty of reading drawings such as FIG. 15 which depicts a kitchen arrangement and entails several optical illusions which interfere with the comprehension thereof, even though the perspective and the general proportions are respected.

What is claimed is:

1. Adaptable device for delimiting and organizing an architectural space of the type model for study and demonstration to construct interior design projects, fair and exhibition stall, partitioning of office or industrial spaces, comprising variable length space elements of reduced scale connected to each other so as to form partitionings adapted to the dimensions of the architectural space to be organized or to be depicted, and decorative objects of reduced scale representing elements serving for decoration or organization of interiors, wherein:

each variable-length space element comprises at least two different parts which are flat or three-dimensional and comprise rectilinear parts, sliding one into the other, the length of each space element varies continuously and linearly under its normal conditions of use, within the limits of its minimum and maximum length, each space element has at least one coupling portion, forming, with a complementary coupling portion belonging to another space element, a disassemblable coupling permitting the intersection of a plurality of space elements articulated around the axis created by the coupling, at least one of the decorative objects, of a size proportional to the dimensions of the object that it represents, is positioned variably and interchangeably on a space element by means of a magnetic link, an adhesive link, or a sliding support, this decorative object itself has an interchangeable design held by a decoration support, and the entire device is of a dimension such that it occupies at most the volume of a suitcase.

2. Device according to claim 1, wherein atleast one of the space has a dimension varying continuously in a single direction, defines a plane surface or a portion of volume partially rectilinear, and is made up of at least a male part and a female part, the male part sliding into the female part, the male part abutting against the female part when the space element is in its shortest position.

3. Device according to claim 1, wherein at least one of the space elements accommodates a removable decoration adapted to hold a decorative object.

4. Device according to claim 2, wherein the parts of at least one of the space elements are adjusted such that they retain their relative position once the length of the element is defined between the limits of its minimum and maximum position.

5. Device according to claim 2, wherein one of the parts of at least one of the space elements has a blocking system such that the parts retain their relative position once the length of the space element is defined, between the limits of its minimum and maximum position, and the blocking system is put in place.

6. Device according to claim 2, wherein a part of at least one of the space elements, is graduated and another part of a space element, has a reference which, associated with the scale on the first part, enables the direct reading of the length of the element.

7. Device according to claim 1, comprising an intersected coupling composed of at least two segments each made up of two portions fitting one inside the other when they are placed facing each other by simple horizontal translation, enabling the passage between its segments of at least one intersecting coupling composed of at least one segment, itself made up of two portions fitting one inside the other, thus enabling the intersection of space elements.

8. Device according to claim 6 according to a first embodiment, wherein a pin passes through different portions of at least one coupling portion, said pin with an overall circular cross-section has a gripping zone, said pin is introduced into the internal opening created by the coupling portions after the coupling portions are placed facing each other and groups of space elements remain integral with each other and pivot relative to each other once the couplings are assembled.

9. Device according to claim 6 according to a second embodiment, wherein the coupling portions of intersected and intersecting groups of space elements are connected by insertion of the male portions into the female portions by elastic deformation of the material of which they are made and the groups of space elements remain integral with each other and pivot relative to each other once the couplings are assembled.

10. Device according to claim 1, wherein at least one of the space elements is made from a material without ferromagnetic and properties and acquires a ferromagnetic property by mounting, on at least one part of its surface, of a thin material adapted to the shape of the space element and having ferromagnetic properties so as to accommodate a magnetized decorative object.

11. Device according to claim 1, wherein the space elements are placed on a foldable surface, having ferromagnetic properties so as to accommodate a magnetized decorative object.

12. Device according to claim 1, wherein two space elements are held in their relative positions by a removable linking accessory, equipped with at least two links.

13. Device according to claim 12, wherein the removable linking accessory is a square.

14. Device according to claim 1, wherein the decorative objects are adapted to accommodate a removable design held by a decoration support and said decorative objects are held in position on a space element by a temporary link which is a magnetic link or a sliding link.

15. Device according to claim 1, wherein certain decorative elements are obtained from an unfolded base adapted to obtain, after folding and assembly, rigidity sufficient to permit the manipulation efforts generated by mounting on a space element with a magnetic or adhesive link present on at least one face of the decorative element, and leaving at least one placement position on at least one edge of at least one face capable of accommodating a decoration support.

16. Device according to claim 1, according to an embodiment of the device using space elements without magnetic properties, wherein certain decorative elements are obtained from an unfolded base adapted to obtain, after folding and assembly, rigidity adequate to permit the manipulation efforts generated by mounting on a sliding link, leaving at least one placement position on at least one edge of at least one face capable of accommodating a decoration support and providing at least one recess to permit the passage of said sliding link designed to position the decoration element on a space element.

17. Device according to claim 1, wherein a decoration support is produced in a shaped material enabling placement and holding of an interchangeable design inserted between the decoration support and the decorative object on which said decoration support is applied.

* * * * *